US012783776B2

(12) United States Patent
Feuillette et al.

(10) Patent No.: US 12,783,776 B2
(45) Date of Patent: Nov. 3, 2026

(54) TRUSTED PARAMETERIZED CELLS (PCELLS) ON BLOCKCHAIN

(71) Applicant: GlobalFoundries U.S. Inc., Malta, NY (US)

(72) Inventors: Romain H.A. Feuillette, Williston, VT (US); Mujahid Muhammad, Essex Junction, VT (US); Alain F. Loiseau, Williston, VT (US)

(73) Assignee: GlobalFoundries U.S. Inc., Malta, NY (US)

( * ) Notice: Subject to any disclaimer, the term of this patent is extended or adjusted under 35 U.S.C. 154(b) by 868 days.

(21) Appl. No.: 18/153,799

(22) Filed: Jan. 12, 2023

(65) Prior Publication Data

US 2024/0242013 A1 Jul. 18, 2024

(51) Int. Cl.
*G06F 30/392* (2020.01)
*G06F 111/02* (2020.01)

(52) U.S. Cl.
CPC ........ *G06F 30/392* (2020.01); *G06F 2111/02* (2020.01)

(58) Field of Classification Search
CPC ........................... G06F 30/392; G06F 2111/02
See application file for complete search history.

(56) References Cited

U.S. PATENT DOCUMENTS

| | | | |
|---|---|---|---|
| 8,910,303 B2 | 12/2014 | Su et al. | |
| 8,977,863 B1 | 3/2015 | Arsintescu | |
| 11,334,697 B1 * | 5/2022 | Beckett | G06F 30/31 |
| 2013/0154024 A1 | 6/2013 | Chapman et al. | |
| 2015/0347667 A1 | 12/2015 | Ellis-Monaghan et al. | |
| 2021/0342822 A1 * | 11/2021 | Lau | G06Q 20/401 |
| 2022/0301878 A1 | 9/2022 | Xie et al. | |
| 2023/0106015 A1 | 4/2023 | Kim et al. | |
| 2023/0117743 A1 | 4/2023 | Zhou et al. | |

OTHER PUBLICATIONS

Specification and Drawings in related U.S. Appl. No. 17/813,344, 23 pages.
Xiaolin Xu et al., "Electronics Supply Chain Integrity Enabled by Blockchain", ACM Transact Des Autom Electron Syst. 2019; 24(3):10.1145/3315571. doi: 10.1145/3315571, 39 pages.
Nitesh Michandani et al., "Blockchain in the Semiconductor Industry: 5 Innovative Use Cases Gaining Traction", birlasoft, https://www.birlasoft.com/articles/blockchain-in-semiconductor-industry-use-cases, Jan. 13, 2022, 12 pages.
Alan D. Porter et al., "Securing the Future with Trusted Traceability and Blockchain", EE Times, https://www.eetimes.com/securing-the-future-with-trusted-traceability-and-blockchain/, Mar. 9, 2022, 5 pages.
Extended European Search Report for European Application No. 24168608.8-1211, mailed Sep. 16, 2024, 10 page.

* cited by examiner

*Primary Examiner* — Jack Chiang
*Assistant Examiner* — Brandon Bowers
(74) *Attorney, Agent, or Firm* — Andrew M. Calderon; Calderon Safran & Wright P.C.

(57) ABSTRACT

The present disclosure relates to relates to integrated circuits and, more particularly, to trusted Pcells leveraging smart contracts on a blockchain and methods of manufacture. In particular, the structure includes a first parameterized cell (Pcell) label generated based on a customer label corresponding to a customer design on a customer network and which comprises a real-time transaction validation for a smart contract on a blockchain network.

20 Claims, 11 Drawing Sheets

TRUSTED PARAMETERIZED CELLS (PCELLS) ON BLOCKCHAIN

BACKGROUND

The present disclosure relates to integrated circuits and, more particularly, to trusted parameterized cells (Pcells) leveraging smart contracts on a blockchain and methods of manufacture.

Integrated circuits are often generated using information provided in a process design kit (PDK). In one example, parameterized cells (Pcells) are used to automatically create dynamic layout instances according to the information within the PDK using electronic design automation (EDA) software. A Pcell layout instance is a part (i.e., physical component) of the integrated circuit device whose structure is dependent on one or more parameters of the Pcell, and each layout instance of the Pcell is automatically generated based on the values of these parameters.

To efficiently design complex circuits of a layout, each device of a PDK is generated by setting parameters of the associated Pcell, which allows the EDA to automatically build different required shapes and layers within the device. Use of Pcells guarantees the integrity of the layout, and its compliance to the necessary manufacturing rules to ensure that the final chip built to the design will function properly. When designing a product, an engineer may "flatten" a Pcell, which breaks the built-in relationship between the shapes and levels of the original device. In other words, when a device is flattened, the engineer can freely move shapes with respect to each other. However, when the device is flattened, this may result in improper device behavior.

SUMMARY

In an aspect of the disclosure, a structure comprises: a first parameterized cell (Pcell) label generated based on a customer label corresponding to a customer design on a customer network and which comprises a real-time transaction validation for a smart contract on a blockchain network.

In an aspect of the disclosure, a structure comprises: a customer label generated based on an intellectual property (IP) block corresponding to a customer design on a customer network, and a mock label generated based on a most recent label of the IP block on a blockchain network.

In an aspect of the disclosure, a method comprises: generating a first parameterized cell (Pcell) label based on a customer label corresponding to a customer design on a customer network, generating a second Pcell label based on the customer design on the customer network, and performing a real-time transaction validation of the first Pcell label to determine whether a first Pcell corresponding to the first Pcell label is flattened.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

Figure 1A:
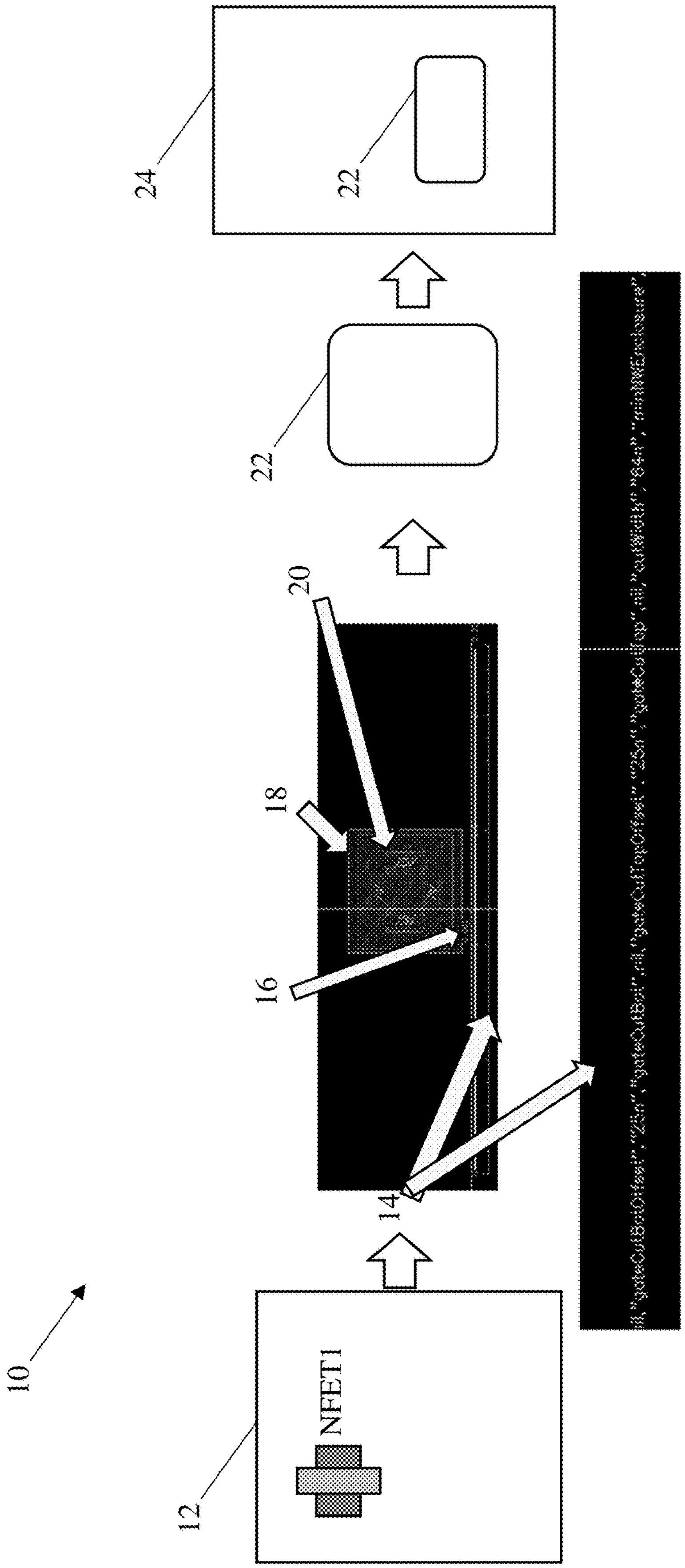
FIGS. 1A-1H show steps in creating parameterized cells (Pcells) and validating the Pcells on a blockchain, amongst other features, in accordance with aspects of the present disclosure.

The present disclosure relates to integrated circuits and, more particularly, to trusted Pcells leveraging smart contracts on a blockchain and methods of manufacture. In more specific embodiments, a Pcell label may be stored on a semi-private blockchain which is shared between a foundry (e.g., a chip manufacturer) and a given customer. Accordingly, foundry approved Pcells may leverage smart contracts on the blockchain. In this way, a structural transaction label may be generated and stored on the blockchain.

In known processes, foundries cannot ensure that the received graphic design system (GDS) was generated using approved Pcells. Therefore, foundries may be exposed to manufacturing risk, modeling risk, and have no feedback on which Pcells need to be improved. Also, in known processes, a design rule check (DRC) may only check Pcells that are within minimum and maximum limits; however, a DRC does not have the capability to check that a trusted Pcell of a foundry has been implemented. Also, verification of Pcells may only occur very late in the process (i.e., right before manufacturing of the integrated chips when the design is tapping out).

Advantageously and in contrast to known circuits, the present disclosure provides additional protection against customer data hacking by using the distributed nature of blockchain technology. For example, if the PDK is modified to create a change in a customer design, the present disclosure will provide protection against the modification. Further, the present disclosure allows for all changes in the design to be tracked using blockchain technology. For example, since all changes in the design are tracked, it is much more difficult for changes in the design to go undetected when a change history is stored and frozen in the blockchain as an immutable record. Also, the present disclosure provides early detection of modifications of the design by using live (i.e., real-time) transaction validation. For example, the modification of the design may include a change that flattens the design and breaks specific ground rules. Accordingly, the verification of any modification will occur prior to the final GDS being provided to the foundry for manufacturing of the integrated circuit.

In the present disclosure, the blockchain may store design modifications as transactions. The blockchain may also represent a full circuit design, including the hierarchy of the circuit design. The blockchain may also be shared by the customer and the foundry (i.e., a semi-private blockchain). In the present disclosure, each transaction may be validated in real time (i.e., live). In particular, cells may generate descriptive labels and each cell may be a device Pcell (e.g., NFET, PFET, capacitor, resistor, inductor, etc.) or an IP block (e.g., efuse 64×4). If a label does not match a layout, the validation fails and the transaction is rejected from being put on the blockchain. Also, a final design may be validated and stored. For example, if the final design generated from a foundry blockchain matches a customer GDS, then the validation is successful.

FIGS. 1A-1H show steps in creating parameterized cells (Pcells) and validating the Pcells on a blockchain, amongst other features, in accordance with aspects of the present disclosure. Further, although FIGS. 1A-1H show Pcells comprising PFETs and NFETs, embodiments are not limited and may be any other device (e.g., capacitor, resistor, inductor, etc.) In FIG. 1A, step 10 may include a first Pcell (e.g., NFET1) being instantiated within an intellectual property (IP) block 12. In embodiments, the Pcell (e.g., NFET1) may be represented by a label 14, coordinate 16, an ID 18, and a cellview 20. In particular, the label 14 may be a list of parameters names and values uniquely defining a design instance, the coordinate 16 may be a point in the x-axis and the y-axis, the ID 18 may be an identifier (e.g., 156), and the cellview 20 may be information about a device (e.g., lvtnfet). As shown in FIG. 1A, a first transaction 22 may include the label 14, the coordinate 16, the ID 18, and the cellview 20 of the first Pcell (e.g., NFET1). Thus, a list of all transactions 24 in FIG. 1A may include the first transaction 22.

Figure 1B:
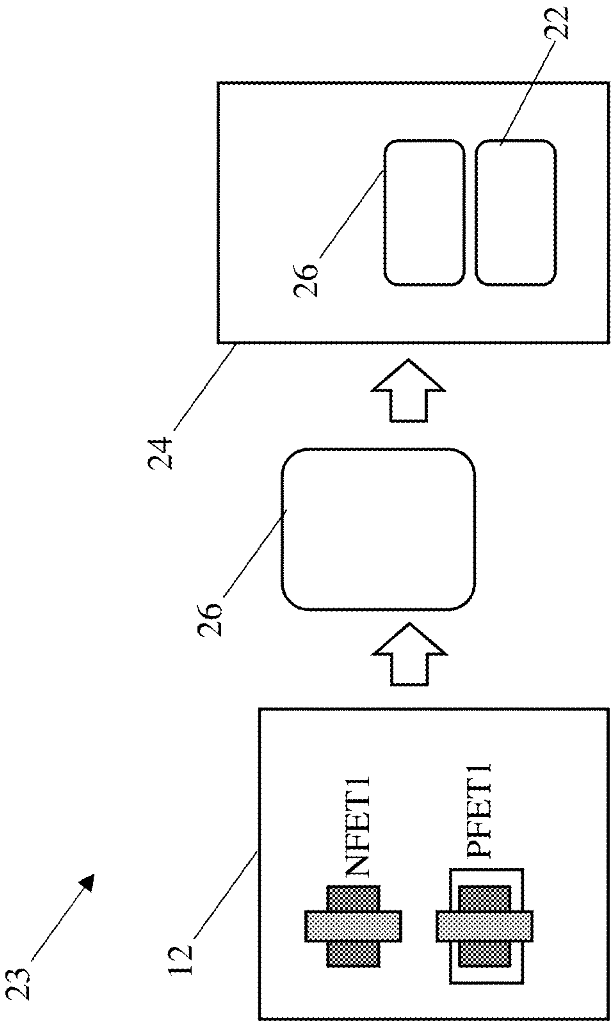

In FIG. 1B, a second step 23 may include a second Pcell (e.g., PFET1) being instantiated within the IP block 12. As shown in FIG. 1B, a second transaction 26 may include the label 14, the coordinate 16, the ID 18, and the cellview 20 of the second Pcell (e.g., PFET1). Thus, the list of all transactions 24 in FIG. 1B may be updated with the second transition 26 (which already includes the first transaction 22).

Figure 1C:
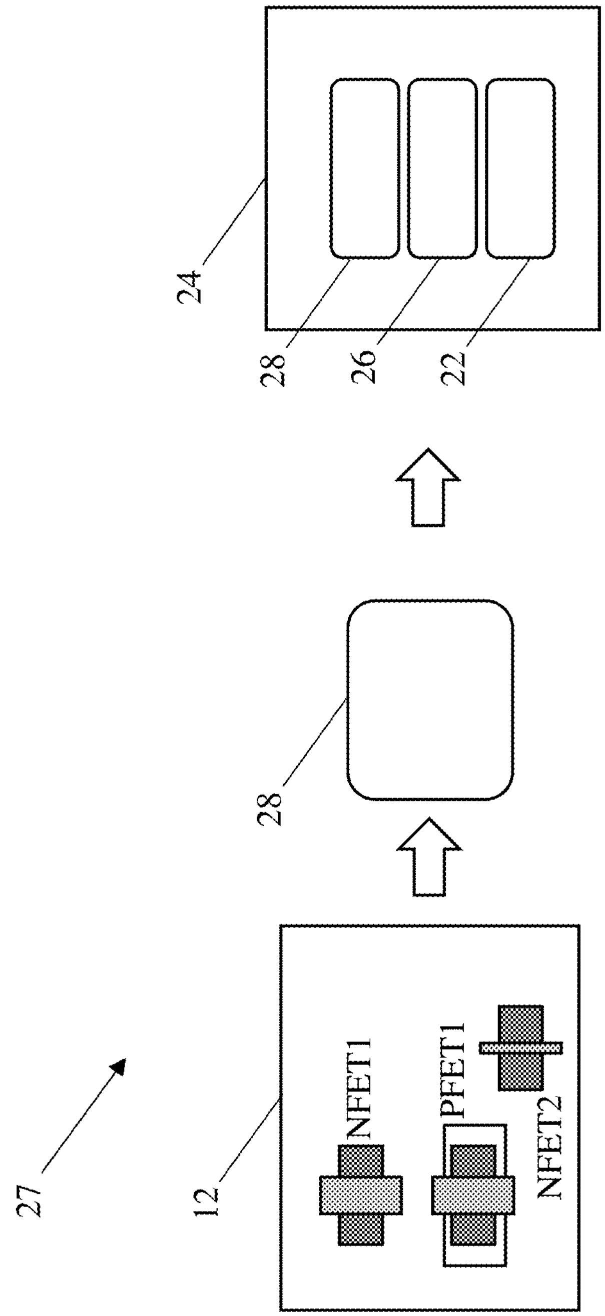

In FIG. 1C, a third step 27 may include a third Pcell (e.g., NFET2) being instantiated within the IP block 12. The third Pcell (e.g., NFET2) may have slight differences from the first Pcell (e.g., NFET1). As shown in FIG. 1C, a third transaction 28 may include the label 14, the coordinate 16, the ID 18, and the cellview 20 of the third Pcell (e.g., NFET2). The list of all transactions 24 in FIG. 1C may be updated with the third transaction 28 (which already includes the first transaction 22 and the second transaction 26).

Figure 1D:
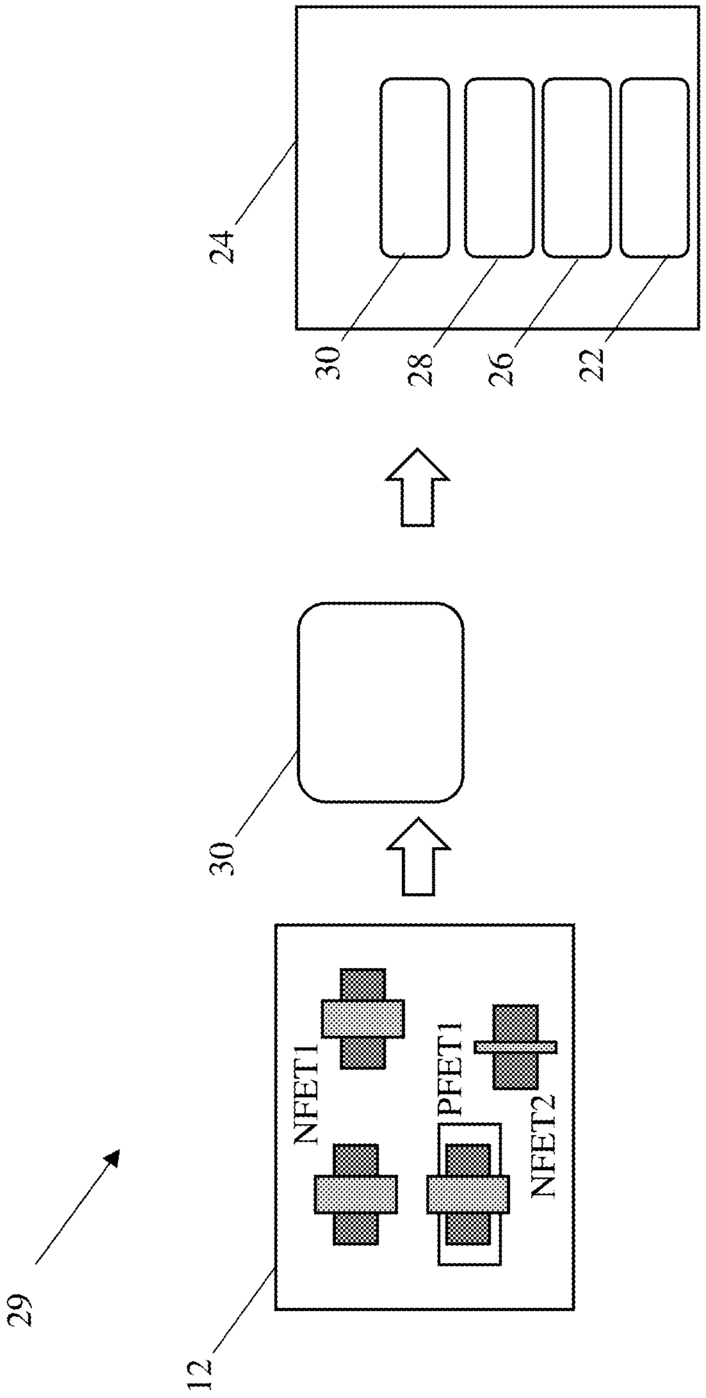

In FIG. 1D, a fourth step 29 may include a fourth Pcell (e.g., NFET1), which is a same instance as the first step 10 being instantiated within the IP block 12. As shown in FIG. 1D, a fourth transaction 30 may include the label 14, the coordinate 16, the ID 18, and the cellview 20 of the fourth Pcell (e.g., NFET1). Since the fourth Pcell (e.g., NFET1) has the same instance as the first step 10 (i.e., the first Pcell (e.g., NFET1)), the label 14 in the fourth transaction 30 is identical to the label 14 in the first transaction 22. The list of transactions 24 in FIG. 1D may be updated with the fourth transaction 30 (which already includes the first transaction 22, the second transaction 26, and the third transaction 28). Similar steps may be taken to instantiate additional IP blocks.

Figure 1E:
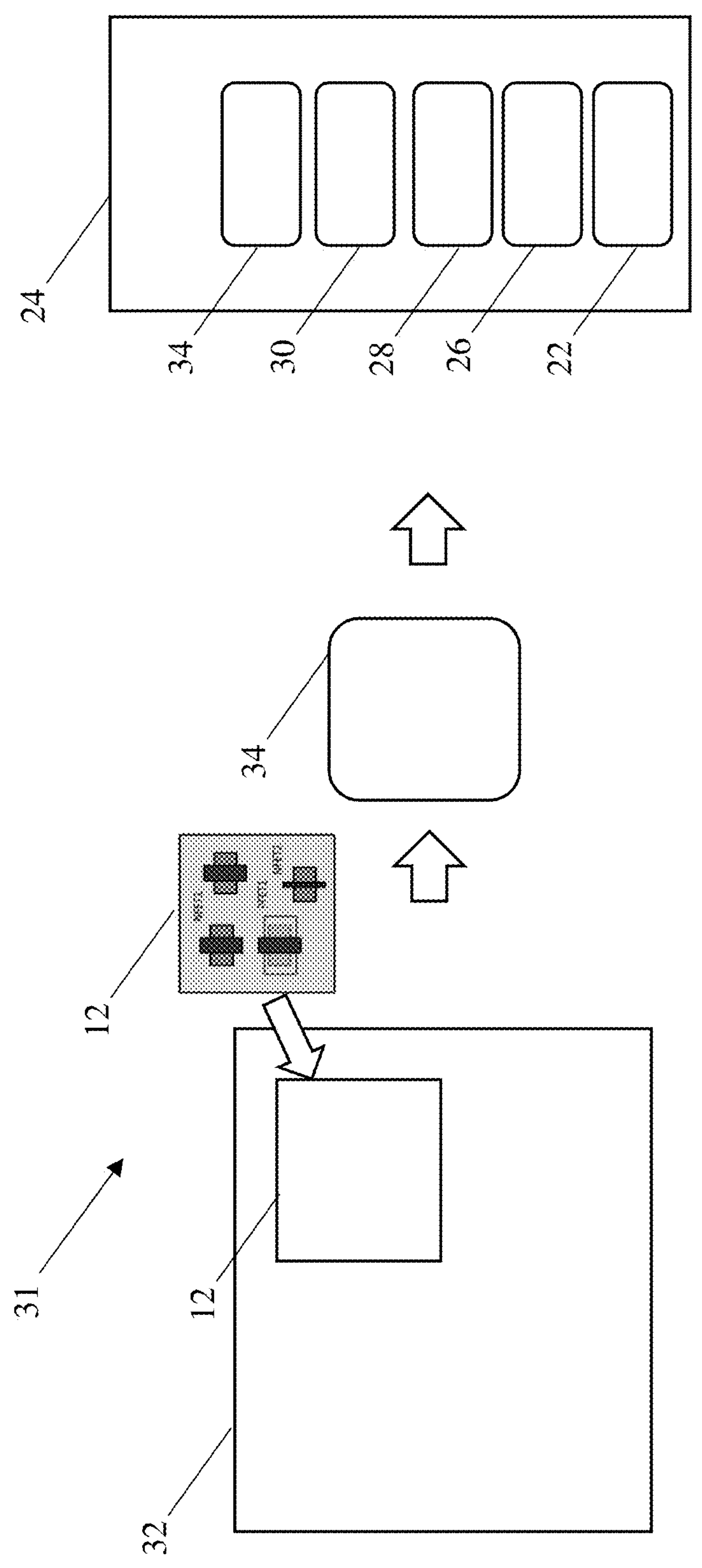

In FIG. 1E, a fifth step 31 may instantiate the IP block 12 at a top level 32. The top level 32 may be a combination of all labels 14, coordinates 16, IDs 18, and cellviews 20 in the IP block 12. In FIG. 1E, a fifth transaction 34 may include the labels 14, the coordinates 16, the IDs 18, and the cellviews 20 of the top level 32. The list of transactions 24 in FIG. 1E may be updated with the fifth transaction 34 (which already includes the first transaction 22, the second transaction 26, the third transaction 28, and the fourth transaction 30).

Figure 1F:
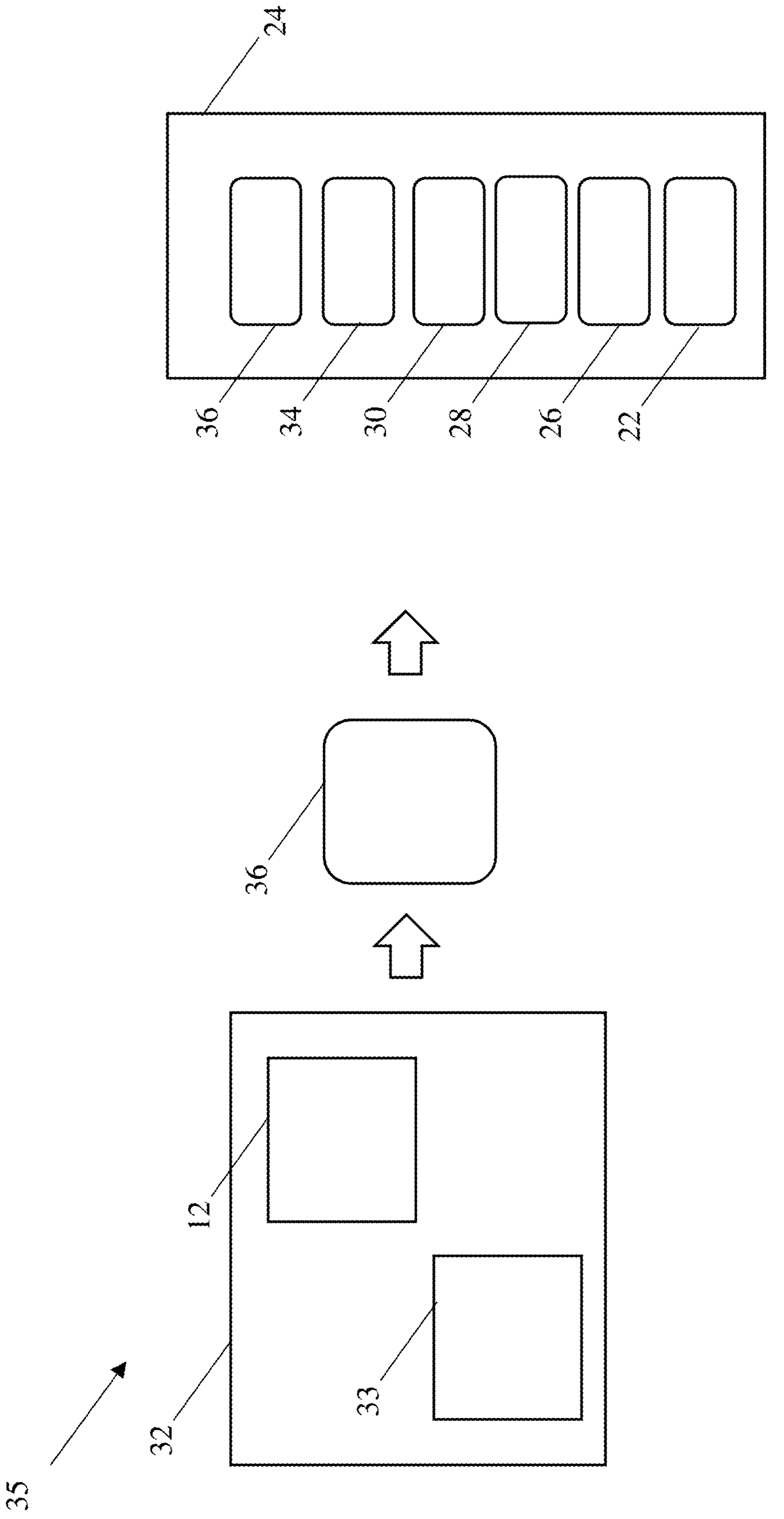

In FIG. 1F, a sixth step 35 may instantiate an IP block 33 at the top level 32. In FIG. 1F, a sixth transaction 36 may include the labels 14, the coordinates 16, the IDs 18, and the cellviews 20 of the top level 32. The list of transactions 24 in FIG. 1F may be updated with the sixth transaction 36 (which already includes the first transaction 22, the second transaction 26, the third transaction 28, the fourth transaction 30, and the fifth transaction 34).

Figure 1G:
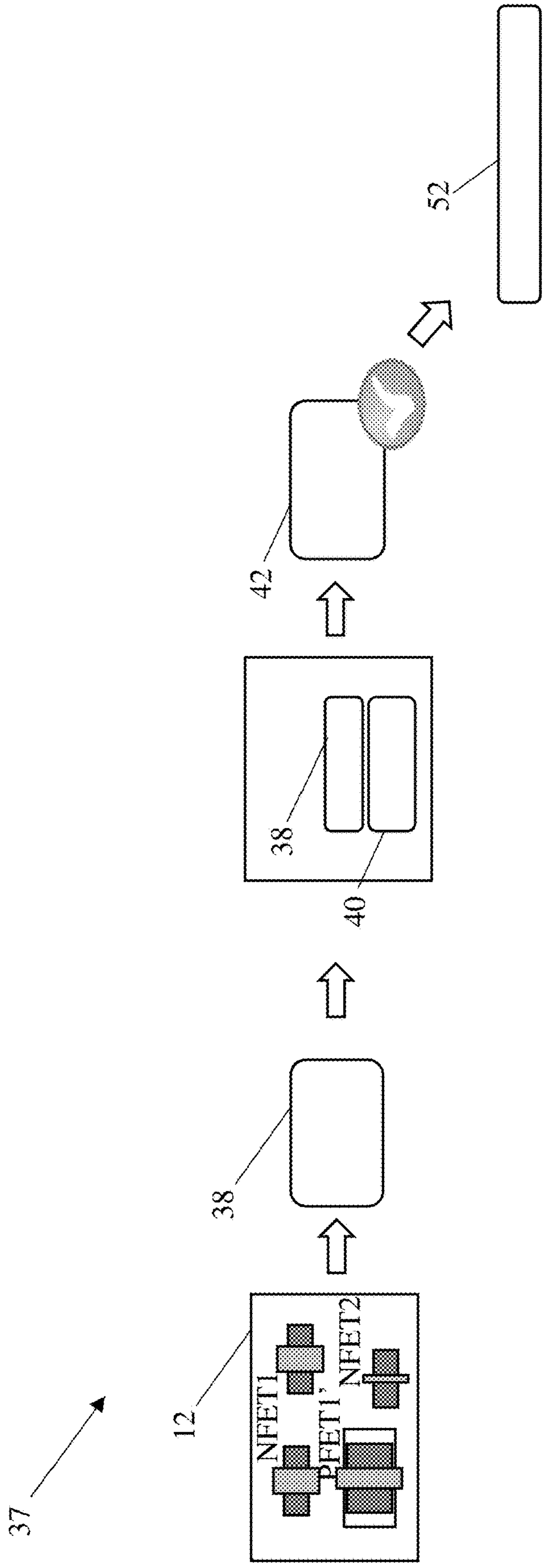

In FIG. 1G, a seventh step 37 may modify the second Pcell (e.g., PFET1) to generate a modified second Pcell (e.g., PFET1') in the IP block 12. In FIG. 1G, an nth transaction 38 may include the label 14, the coordinate 16, the ID 18, and the cellview 20 of the modified second Pcell (e.g., PFET1'). Further, the label 14 of the modified second Pcell (e.g., PFET1') may be different from the label of the second Pcell (e.g., PFET1).

The list of transactions 24 in FIG. 1G may be updated with the nth transaction 38 and the previous transactions 40 (e.g., which includes the first transaction 22, the second transaction 26, the third transaction 28, the fourth transaction 30, the fifth transaction 34, and the sixth transaction 36, and any other transaction before the nth transaction 38).

In the seventh step 37, the list of transactions 24 may go through blockchain validation 42. In particular, since the modified second Pcell (e.g., PFET1') is a modified version of the second Pcell (e.g., PFET1), a successful blockchain validation is returned, as indicated by the checkmark. The blockchain validation 42 is an example of a live (i.e., real-time) transaction validation 52. Also, when the IP is rebuilt on a foundry side, the last transaction (i.e., the nth transaction 38) of each ID 18 is taken to avoid overlap.

Figure 1H:
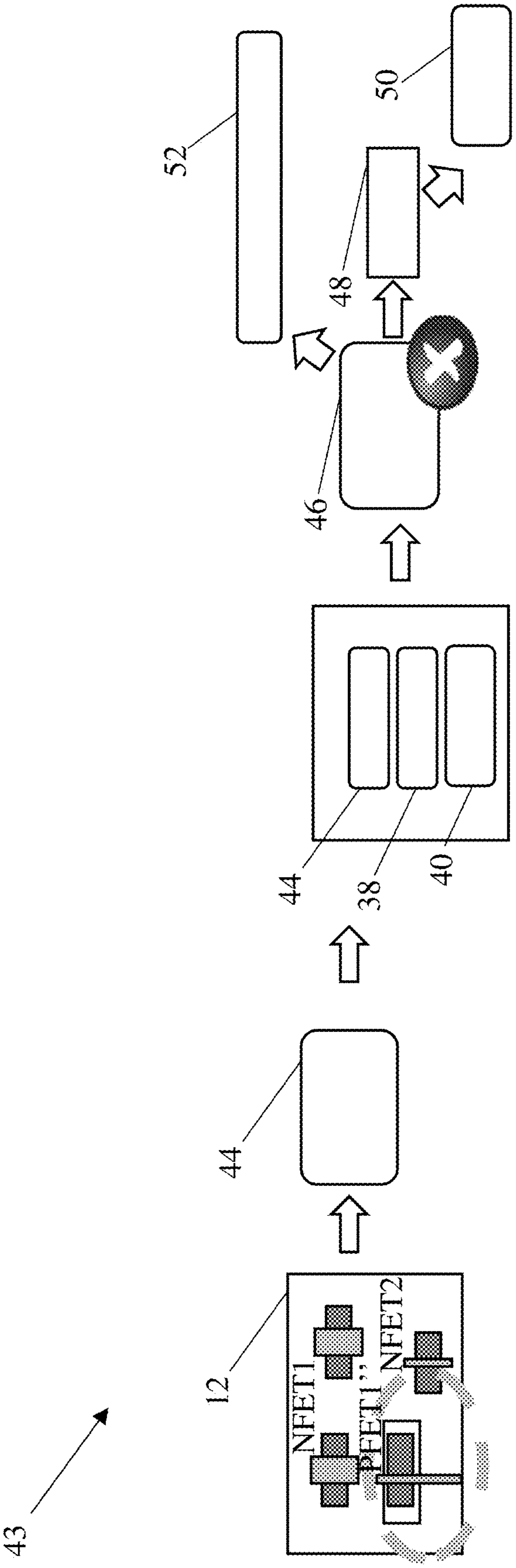

In FIG. 1H, an eighth step 43 may be an attempt to modify a layout without using the second Pcell (e.g., PFET1). In particular, the attempt to modify the layout is represented as a modified Pcell (e.g., PFET1") in the IP block 12. In an example, the modified Pcell (e.g., PFET1") may be created by flattening a Pcell, which breaks the built-in relationship between the shapes and levels of the original device, and which include changes that violate ground rules of the layout and which are different from Pcell instances in a customer library.

In FIG. 1H, a kth transaction 44 may include the label 14, the coordinate 16, the ID 18, and the cellview 20 of the modified Pcell (e.g., PFET1"). Further, the label 14 of the modified Pcell (e.g., PFET1") is identical to the label 14 of the second Pcell (e.g., PFET1). In fact, the label 14 of the modified Pcell (e.g., PFET1") may be identical to the label 14 of the second Pcell (e.g., PFET1) because the label 14 of the modified Pcell (e.g., PFET1") is not regenerated using the second Pcell (e.g., PFET1). The list of transactions 24 in FIG. 1H may be updated with the kth transaction 44 (which already includes the nth transaction 38 and the previous transactions 40).

In the eighth step 43, the list of transactions 24 may go through another blockchain validation 46. In particular, since the modified Pcell (PFET1") is an attempt to change the layout which does not match the second Pcell (e.g., PFET1), an unsuccessful block validation is returned, as indicated by "X". Thus, in FIG. 1H, the IP is not trusted as shown in step 48 and an alert is provided at step 50 (e.g., an alert message 50). The alert may be sent to the customer to notify the customer that an attempt was made to change the customer design. The blockchain validation 46 is another example of the live (i.e., real-time) transaction validation 52.

Figure 2:
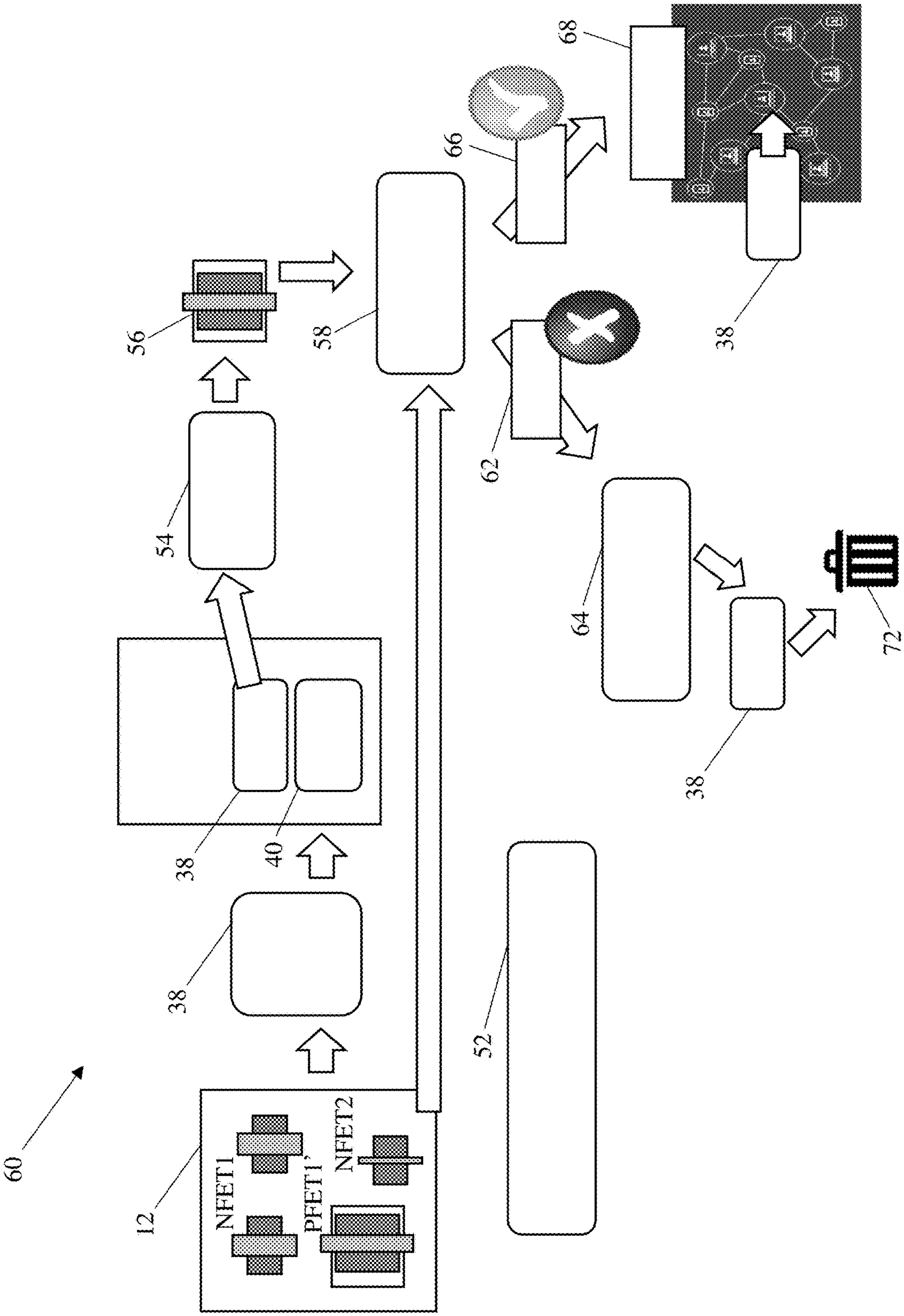
FIG. 2 shows steps in validating transactions and adding to the blockchain, amongst other features, in accordance with aspects of the present disclosure.

FIG. 2 show steps in validating transactions and adding to the blockchain, amongst other features, in accordance with aspects of the present disclosure. In step 60 of FIG. 2, the IP Block 12 includes the first Pcell (e.g., NFET1), the modified second Pcell (e.g., PFET1'), the third Pcell (e.g., NFET2), and the fourth Pcell (e.g., NFET1, which is the same instance as the NFET1 in the first step 10).

In FIG. 2, the nth transaction 38 may include the label 14, the coordinate 16, the ID 18, and the cellview 20 of the modified second Pcell (e.g., PFET1'). Further, the label 14 of the modified second Pcell (e.g., PFET1') may be different from the label of the second Pcell (e.g., PFET1). The list of transactions 24 in FIG. 2 may be updated with the nth transaction 38 and the previous transactions 40 (e.g., which includes the first transaction 22, the second transaction 26, the third transaction 28, the fourth transaction 30, the fifth transaction 34, and the sixth transaction 36, and any other transaction before the nth transaction 38).

In FIG. 2, step 54 may include a process design kit (PDK) which generates a Pcell 56 (e.g., PFET1') based on the label 14 (i.e., customer label) in the nth transaction 38. For additional security, a PDK location may be picked at random among several locations and verified through a checksum method as known in the art.

In step 58, a trusted IP tool compares the generated Pcell 56 with a customer layout. The trusted IP tool comparing the generated Pcell 56 with the customer layout is an example of the live (i.e., real-time) transaction validation at step 52. In step 66, if the generated Pcell 56 matches the customer layout, then the validation is successful (i.e., a match), as indicated by the checkmark. If the validation is successful, then the nth transaction 38 is added to all nodes of the blockchain in step 68. One of ordinary skill in the art would understand that the nth transaction 38 can be added to all nodes of the blockchain at step 68 using known methods.

On the other hand, in step 62, if the validation is unsuccessful, as indicated by "X", the nth transaction 38 is not added to the blockchain and is rejected at step 64. As a consequence of the nth transaction 38 being rejected, the nth transaction 38 may be removed or deleted as indicated by the icon 72.

In FIG. 2, multiple transactions may be validated at the same time. In embodiments, the blockchain may be a semi-private blockchain network which is shared between a customer of the customer network and a foundry. Further, the trusted IP tool in FIG. 2 may comprise a computer infrastructure 120 as described in FIG. 4 for performing the steps.

Figure 3:
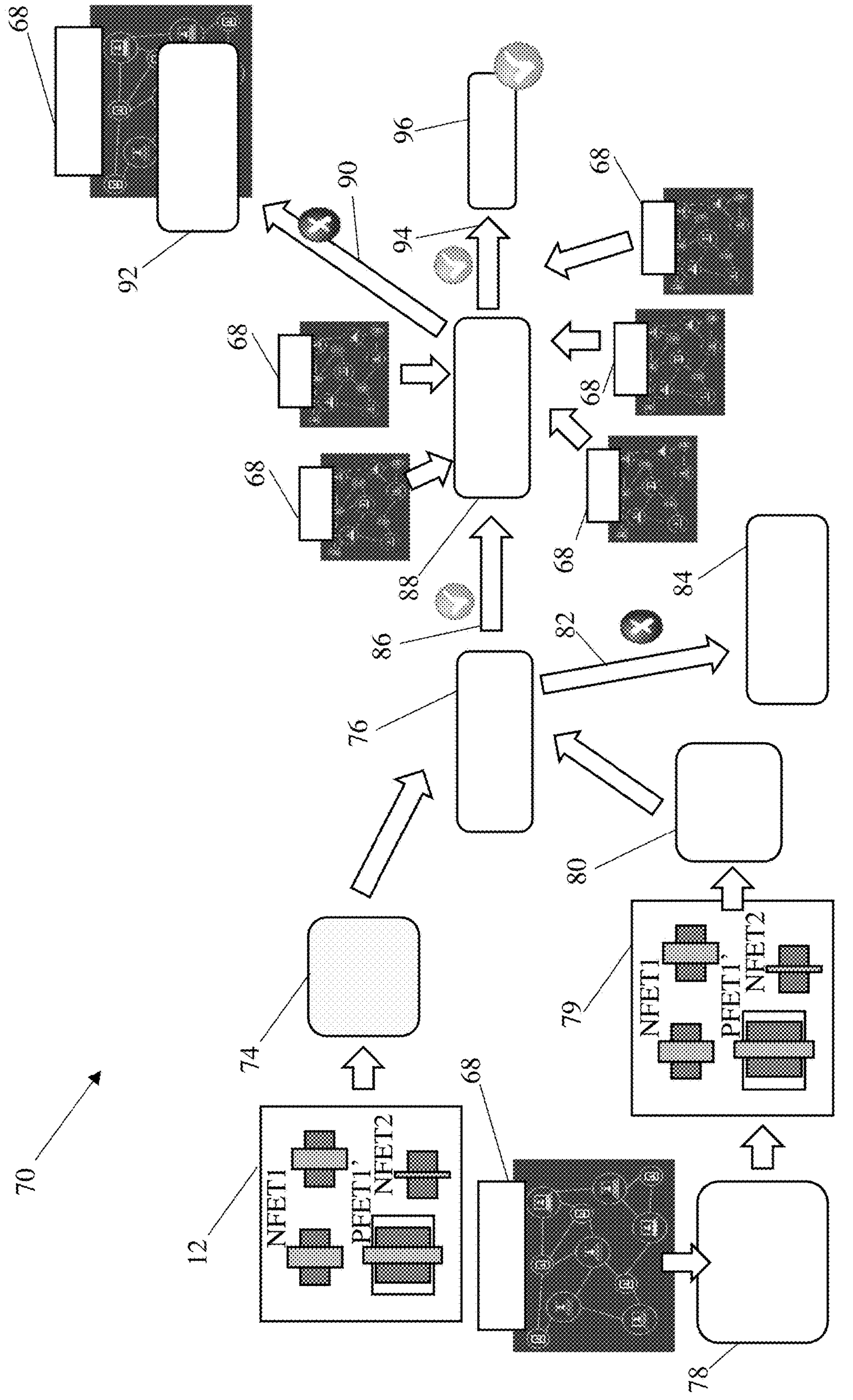
FIG. 3 shows steps in validating a customer design as trusted intellectual property (IP), amongst other features, in accordance with aspects of the present disclosure.

FIG. 3 show steps in validating a customer design as trusted intellectual property (IP), amongst other features, in accordance with aspects of the present disclosure. In step 70 of FIG. 3, the IP Block 12 includes the first Pcell (e.g., NFET1), the modified second Pcell (e.g., PFET1'), the third Pcell (e.g., NFET2), and the fourth Pcell (e.g., NFET1, which is the same instance as the NFET1 in the first step 10). In step 74 of FIG. 3, the customer final design transaction includes the labels 14, the coordinates 16, the ID 18, and the cellview 20 of the IP Block 12. In the remaining steps 78-96 of FIG. 3, the foundry may implement the steps using a computer infrastructure 120 as described in FIG. 4.

In step 78 of FIG. 3, the foundry (e.g., the computer infrastructure 120 in FIG. 4) generates a mock design (as shown in step 79) based on the blockchain by taking the latest label 14 for each IP/cellview 20 pair. Further, in step 79, the mock design includes the first Pcell (e.g., NFET1), the modified second Pcell (e.g., PFET1'), the third Pcell (e.g., NFET2), and the fourth Pcell (e.g., NFET1, which is the same instance as the NFET1 in the first step 10). In step 80 of FIG. 3, the mock design transaction includes the labels 14, the coordinates 16, the ID 18, and the cellview 20.

In FIG. 3, at step 76, the foundry compares all labels 14 from the mock design transaction against the customer final design transaction. In step 86, if the validation is successful (i.e., a match), as indicated by the checkmark, at step 88, the foundry checks that all blockchain nodes in the blockchain are identical. In step 90, if the validation is not successful, as indicated by "X", (i.e., all blockchain nodes in the blockchain are not identical), then the blockchain is compromised as noted at step 92.

In step 94, if the validation is successful, as indicated by the checkmark, the IP is trusted as noted in step 96. Further, in FIG. 3, in step 82, if the validation is not successful (i.e., not a match), as indicated by "X", the design is compromised as noted at step 84. In embodiments, the blockchain 68 may be a semi-private blockchain network which is shared between the customer of the customer network and the foundry.

Figure 4:
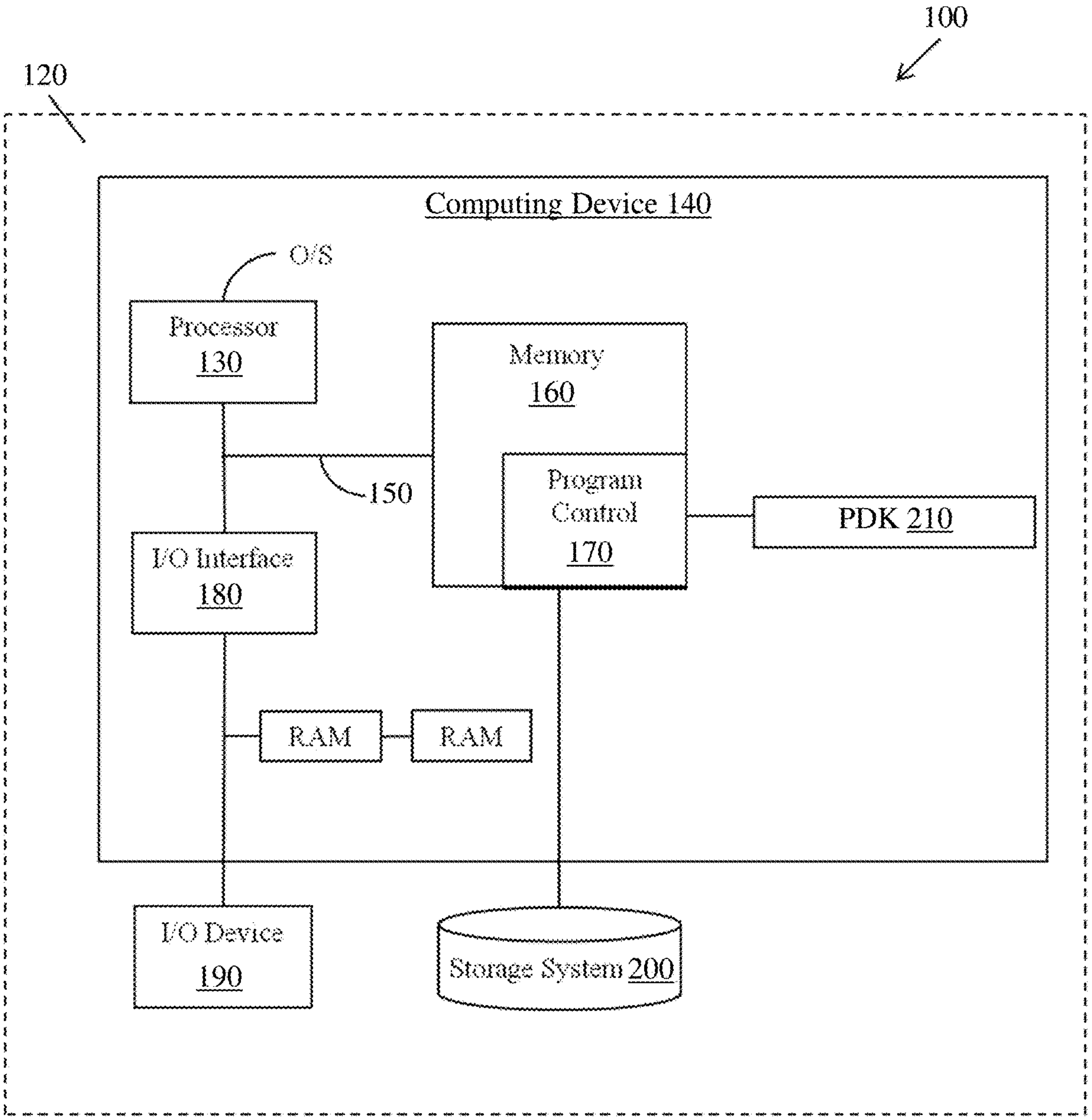
FIG. 4 shows a high level computer infrastructure for implementing processes in accordance with aspects of the invention.

FIG. 4 shows a high level computer infrastructure for implementing processes in accordance with aspects of the invention. In particular, FIG. 4 shows an illustrative environment 100 for managing the processes in accordance with the invention. To this extent, environment 100 includes a computer infrastructure 120 or other computing system that may perform the processes described herein. In particular, computer infrastructure 120 includes a computing device 140. The computing device 140 may be resident on a network infrastructure or computing device of a third party service provider.

The computing device 140 also includes a processor 130 (e.g., CPU), memory 160, an I/O interface 180, and a bus 150. The memory 160 may include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM0, and an operating system (O/S).

The computing device 140 is in communication with external I/O device/resource 190 and storage system 200. For example, I/O device 190 may comprise any device that enables an individual to interact with computing device 140 (e.g., user interface) or any device that enables computing device 140 to communicate with one or more other computing devices using any type of communications link. The external I/O device/resource 190 may be for example, a handheld device, PDA, handset, keyboard, etc.

In general, processor 130 executes computer program code (e.g., program control 170) which may be stored in memory 160 and/or storage system 200. Moreover, in accordance with aspects of the invention, program control 170 controls a PDK 210, which performs processes described herein. The PDK 210 may be implemented as one or more program code in program control 170 stored in memory 160 as separate or combined modules. Additionally, the PDK 210 may be implemented in a programmable gate array, as separate dedicated processors, or as a single or several processors to provide the function of these tools. While executing the computer program code, the processor 130 may read and/or write data to/from memory 160, storage system 200, and/or I/O interface 180. The program code executes the process of the invention. The bus 150 provides a communications link between each of the components in the computing device 140.

By way of example, the PDK 210 may be configured to generate a plurality of parameterized cell (Pcell) labels based on a customer label corresponding to a customer design on a customer network. The PDK 210 may perform a real-time transaction validation of the Pcell labels to determine whether the Pcells have been flattened. This real-time transaction validation includes comparing a first Pcell label with a second Pcell label. The PDK 210 may add a transaction corresponding to the first Pcell label to a blockchain network in response to the first Pcell label matching the second Pell label. The PDK 210 may also prevent a transaction corresponding to the first Pcell label from being added to the blockchain network in response to the first Pcell label not matching the second Pcell label.

The integrated circuit manufactured using the methods described herein may be utilized in system on chip (SoC) technology. The SoC is an integrated circuit (also known as a "chip") that integrates all components of an electronic system on a single chip or substrate. As the components are integrated on a single substrate, SoCs consume much less power and take up much less area than multi-chip designs with equivalent functionality. Because of this, SoCs are becoming the dominant force in the mobile computing (such as in Smartphones) and edge computing markets. SoC is also used in embedded systems and the Internet of Things.

The method(s) as described above is used in the fabrication of integrated circuit chips. The resulting integrated circuit chips may be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either surface interconnections and buried interconnections or both surface interconnections and buried interconnections). In any case the chip is then integrated with other chips, discrete circuit elements, and/or other signal processing devices as part of either (a) an intermediate product, such as a motherboard, or (b) an end product. The end product may be any product that includes integrated circuit chips, ranging from toys and other low-end applications to advanced computer products having a display, a keyboard or other input device, and a central processor.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A structure comprising:

a first parameterized cell (Pcell) label generated based on a customer label corresponding to a customer design on a customer network and which comprises a real-time transaction validation for a smart contract on a blockchain network; and an intellectual property (IP) tool configured to compare the first Pcell label with a second Pcell label to perform the real-time transaction validation of the first Pcell label.

2. The structure of claim 1, wherein the second Pcell label is generated based on the customer design on the customer network.

3. The structure of claim 2, wherein the IP tool is further configured to add a transaction corresponding to the first Pcell label to the blockchain network in response to the first Pcell label matching the second Pcell label.

4. The structure of claim 3, wherein the blockchain network is a semi-private blockchain network which is shared between a customer of the customer network and a client.

5. The structure of claim 2, wherein the IP tool is further configured to prevent a transaction corresponding to the first Pcell label from being added to the blockchain network in response to the first Pcell label not matching the second Pcell label.

6. The structure of claim 5, wherein the first Pcell label corresponds to a flattened cell, and the IP tool is further configured to send an alert indicating that first Pcell label is not trusted in response to the first Pcell label not matching the second Pcell label.

7. The structure of claim 1, wherein the real-time transaction validation occurs prior to a final graphic design system (GDS) is provided to a client.

8. The structure of claim 1, wherein the customer label comprises a list of parameter names and values uniquely defining a design instance.

9. The structure of claim 2, wherein the first Pcell label corresponds to a first device and the second Pcell label corresponds to a second device.

10. The structure of claim 9, wherein the first device comprises a field effect transistor (FET) and the second device comprises a capacitor.

11. The structure of claim 1, wherein:

the first parameterized cell is based on a customer label generated based on an intellectual property (IP) block corresponding to the customer design on the customer network; and further comprising a mock label generated based on a most recent label of the IP block on the blockchain network.

12. The structure of claim 11, further comprising a computer infrastructure configured to compare the customer label generated based on the IP block with the mock label generated based on the most recent label of the IP block on the blockchain network.

13. The structure of claim 12, wherein the computer infrastructure determines that a design is compromised in response to the customer label not matching the mock label.

14. The structure of claim 12, wherein the computer infrastructure is further configured to check that blockchain nodes on the blockchain network are identical in response to the customer label matching the mock label.

15. The structure of claim 14, wherein the computer infrastructure determines that the customer design is a trusted IP in response to a determination that the blockchain nodes are identical.

16. The structure of claim 14, wherein the computer infrastructure determines that the blockchain network is compromised in response to a determination that all blockchain nodes are not identical.

17. A method comprising:

generating a first parameterized cell (Pcell) label based on a customer label corresponding to a customer design on a customer network;

generating a second Pcell label based on the customer design on the customer network; and performing a real-time transaction validation of the first Pcell label to determine whether a first Pcell corresponding to the first Pcell label is flattened; and comparing the first Pcell label with a second Pcell label to perform the real-time transaction validation of the first Pcell label.

18. The method of claim 17, wherein the performing the real-time transaction validation comprises comparing the first Pcell label with the second Pcell label.

19. The method of claim 18, further comprising adding a transaction corresponding to the first Pcell label to a blockchain network in response to the first Pcell label matching the second Pcell label.

20. The method of claim 18, further comprising preventing a transaction corresponding to the first Pcell label from being added to a blockchain network in response to the first Pcell label not matching the second Pcell label.

* * * * *